United States Patent
Beuschel et al.

(10) Patent No.: US 11,458,873 B2
(45) Date of Patent: Oct. 4, 2022

(54) METHOD FOR DETERMINING A FLUID PRESSURE

(71) Applicant: Conti Temic microelectronic GmbH, Nuremberg (DE)

(72) Inventors: Michael Beuschel, Stammham (DE); Stefan Bauer, Engelbrechtsmuenster (DE)

(73) Assignee: Conti Temic microelectronic GmbH

( * ) Notice: Subject to any disclaimer, the term of this patent is extended or adjusted under 35 U.S.C. 154(b) by 653 days.

(21) Appl. No.: 16/440,507

(22) Filed: Jun. 13, 2019

(65) Prior Publication Data

US 2019/0381921 A1    Dec. 19, 2019

(30) Foreign Application Priority Data

Jun. 13, 2018  (DE) .................. 10 2018 209 386.5

(51) Int. Cl.
   B60N 2/90   (2018.01)
   G01L 7/00   (2006.01)
   G01L 17/00  (2006.01)

(52) U.S. Cl.
   CPC .............. B60N 2/914 (2018.02); G01L 7/00 (2013.01); G01L 17/00 (2013.01)

(58) Field of Classification Search
   CPC ............ B60N 2/914; G01L 7/00; G01L 17/00
   USPC ...................................................... 297/217.2
   See application file for complete search history.

(56) References Cited

U.S. PATENT DOCUMENTS

| | | | |
|---|---|---|---|
| 2003/0217601 A1* | 11/2003 | Seals | G01L 17/00 73/729.1 |
| 2007/0000559 A1 | 1/2007 | Ebel | |
| 2013/0166078 A1 | 6/2013 | Heger et al. | |
| 2014/0318667 A1 | 10/2014 | Ebel | |
| 2016/0297333 A1 | 10/2016 | Doerfler et al. | |

FOREIGN PATENT DOCUMENTS

| | | |
|---|---|---|
| DE | 103 33 204 A1 | 2/2005 |
| DE | 10 2010 022 020 A1 | 12/2011 |
| DE | 10 2011 122 392 A1 | 6/2013 |
| DE | 10 2014 013 674 A1 | 3/2016 |
| DE | 10 2015 113 029 A1 | 10/2016 |
| DE | 10 2010 063 136 B4 | 11/2016 |
| DE | 10 2016 210 815 A1 | 12/2017 |

* cited by examiner

*Primary Examiner* — Mark R Wendell (57) ABSTRACT

A method for determining a fluid pressure in a pneumatic bladder of a pneumatic adjusting device of a vehicle seat is disclosed, wherein the pneumatic bladder is connected to a valve for the filling or emptying of the bladder with or of fluid. Fluid start pressure at the valve is provided as initial pressure for determining of the fluid pressure in the bladder. Fluid throughflow through the valve device is determined using a first assignment rule which assigns the fluid throughflow to the fluid start pressure at the valve. The fluid throughflow obtained using the first assignment rule over a predetermined period of time is summed to determine a fluid quantity that has flowed through the valve. Fluid pressure present in the bladder is determined using a second assignment rule which assigns the fluid pressure present in the bladder to the determined fluid quantity.

18 Claims, 5 Drawing Sheets

METHOD FOR DETERMINING A FLUID PRESSURE

BRIEF DESCRIPTION OF THE DRAWINGS

Exemplary embodiments are discussed in more detail below with reference to the drawings, in which.

DETAILED DESCRIPTION

The present disclosure relates to a method for determining a fluid pressure in a pneumatic bladder of a pneumatic adjusting device of a vehicle seat, and to a computer program product for carrying out a method of said type and also to a pneumatic adjusting device for a vehicle seat for determining the fluid pressure.

In modern vehicles, pneumatic bladders which are fillable with a fluid or pressure medium, in particular with compressed air, are situated as actuating elements of a pneumatic adjusting device in a region of the seat surface or backrest (together referred to as seat bearing surface) of a vehicle seat. These bladders can be supplied with pressure medium via a respective pressure medium line. By virtue of a respective bladder being filled with or emptied of pressure medium, the volume thereof is varied, such that the characteristics of the backrest or seat surface can be adjusted in terms of contour in this way. An individual adaptation of the seats to the occupants is thus made possible. For the filling of a bladder with pressure medium or for the emptying of a bladder, the bladder is commonly fluidically connected to a pressure medium source, for example a fluid compressor or compressor, and a corresponding valve device. A control unit serves for controlling the filling and emptying of a respective bladder.

To now determine the pressure present in the bladder or to be able to easily restore a performed setting of the contour of the seat bearing surface for example in the event of a driver change, it is conceivable for the pressure values in the individual bladders to each be measured using a pressure sensor and in particular stored electronically in the vehicle. The pressure measurement is commonly performed using either an absolute pressure sensor or a relative pressure sensor. The use of pressure sensors is however expensive and cumbersome.

Sensorless pressure models for determining the pressure values in the bladder are duly known. However, such models are based on measured characteristic curves, which are specific to the entirety of the pneumatic components of the pneumatic adjusting device. An assignment of individual components to the model is not possible. A partial parameterization in the event of changes of individual components of the pneumatic system is likewise not possible.

It is therefore desirable to create an inexpensive and more adaptable method for determining a fluid pressure in a pneumatic bladder.

According to a first aspect of the disclosure, a method for determining a fluid pressure in a pneumatic bladder of a pneumatic adjusting device of a vehicle seat is created, wherein the pneumatic bladder is connected to a valve device for the filling or emptying of the bladder with or of fluid. Here, the method comprises the following steps: a) the provision of a fluid start pressure or fluid start pressure value, prevailing at the valve device, as initial pressure or initial pressure value for the determination of the fluid pressure or fluid pressure value in the bladder; b) the determination of a fluid throughflow through the valve device using a first assignment rule which assigns the fluid throughflow to the fluid start pressure prevailing at the valve device; c) the summation or integration of the fluid throughflow obtained using the first assignment rule over a predetermined period of time in order to determine a fluid quantity that has flowed through the valve device; and d) the determination of the fluid pressure present in the bladder using a second assignment rule which assigns the fluid pressure present in the bladder to the determined fluid quantity. Through this method, it is possible to determine the fluid pressure in the pneumatic bladder without the use of a pressure sensor. Furthermore, the first assignment rule and/or the second assignment rule can be adapted to the respective pneumatic components of the adjusting device, such as for example fluid compressor, filling valve or ventilation valve. The proposed method is thus an inexpensive method for fluid pressure determination, which is easily adaptable to component changes of the pneumatic adjusting device.

In one embodiment of the method, the fluid throughflow is a mass flow and the fluid quantity is a fluid mass, or the fluid throughflow is a volume flow and the fluid quantity is a fluid volume. By means of this embodiment, simple balance equations can be used for establishing the first and/or second assignment rule.

In a further embodiment, the fluid temperature is taken into consideration in the determination of the fluid pressure. The fluid temperature is preferably regarded as being constant and is set as being equal to the ambient temperature around the pneumatic adjusting device. This reduces the number of equations and further simplifies the pneumatic method.

In a further embodiment, the above-stated steps a) to d) are repeated, wherein the fluid pressure determined during the previous execution of the steps a) to d) is used as fluid start pressure for the subsequent execution of the steps a) to d). In other words, the method is performed in a loop. In this way, it is for example possible for the method for fluid pressure determination to be performed for as long as a vehicle occupant or user sets their desired fluid pressure in the bladder of the vehicle seat. The method can thus, in sensorless fashion, determine and possibly store, or make available for further use, the fluid pressure set in the bladder by the user.

In a preferred embodiment, the method furthermore comprises the predefinition of a desired fluid target pressure in the bladder and the repetition of the steps a) to d) until the fluid pressure corresponds to the desired fluid target pressure. In this way, it is for example possible for a fluid target pressure desired by the user to be restored in the bladder at any time without the need for a pressure sensor.

In a further embodiment, for the initial provision of the fluid start pressure or fluid start pressure value, the bladder is emptied until a defined minimum fluid pressure or fluid pressure value is present in the bladder, and the defined minimum fluid pressure or fluid pressure value is used as fluid start pressure or as fluid start pressure value. It is also possible that, for the initial provision of the fluid start pressure or of the fluid start pressure value, the bladder is filled until a defined maximum fluid pressure or fluid pressure value is present in the bladder, and that the defined maximum fluid pressure or fluid pressure value is used as fluid start pressure or as fluid start pressure value. By virtue of the bladder being completely emptied or filled to a maximum extent, the bladder has defined boundary conditions for which the fluid pressure present in the bladder is known or stored. In this way, the method can be easily initialized, and the fluid start pressure can be provided upon the initial execution of steps a) to d).

In a further embodiment, the valve device has a fluid compressor, and a filling valve connected to the fluid compressor, for the filling of the bladder, and the first assignment rule approximates a characteristic curve of the fluid compressor and/or a nozzle equation of the filling valve. By virtue of the fact that the first assignment rule approximates only a characteristic curve of the fluid compressor and/or only a nozzle equation of the filling valve, but not for example the bladder or the vehicle seat, the first assignment rule can be established easily and with little effort. Here, said characteristic curve can for example be measured independently of a bladder or a vehicle seat, and the parameters of the first assignment rule can be determined.

In a further refinement, the valve device has a ventilation valve for the emptying of the bladder, and the first assignment rule approximates a nozzle equation of the ventilation valve. By virtue of the fact that the first assignment rule approximates only a nozzle equation of the ventilation valve, but not for example the bladder or the vehicle seat, the first assignment rule can again be established easily and with little effort. Here, said characteristic curve can for example be measured independently of a bladder or a vehicle seat, and the parameters of the first assignment rule can be determined.

In a particularly preferred embodiment, the first assignment rule is a polynomial function, in particular a first-degree polynomial function or a linear function. By virtue of the first assignment rule being a first-degree polynomial function, the method requires less processing power and less processing time.

In a further embodiment, it is also possible for the valve device to have both a fluid compressor, and a filling valve connected to the fluid compressor, for the filling of the bladder, and a ventilation valve for the emptying of the bladder. In this embodiment, the first assignment rule has a first assignment sub-rule for the filling of the bladder and a second assignment sub-rule for the emptying of the bladder. By virtue of the first assignment rule having two assignment sub-rules for the separate filling and emptying of the bladder, it is possible for the filling of the bladder and the emptying of the bladder to be replicated separately from one another in the method. In this way, the behavior of the user until the point at which the desired fluid pressure has been set can be easily replicated using the method. It is also possible for individual component changes, which relate for example only to the filling valve or only to the ventilation valve, to be reproduced quickly and in uncomplicated fashion in the method.

In a particularly preferred embodiment, the first assignment sub-rule takes into consideration a characteristic curve of the fluid compressor and/or a nozzle equation of the filling valve or the first assignment sub-rule approximates a characteristic curve of the fluid compressor and/or a nozzle equation of the filling valve, but not for example the bladder or the vehicle seat. Furthermore, the second assignment sub-rule takes into consideration a nozzle equation of the ventilation valve or the second assignment sub-rule approximates a nozzle equation of the ventilation valve, but not for example the bladder or the vehicle seat. In this way, the first assignment sub-rule and the second assignment sub-rule can again be established easily and with little effort.

In a particularly preferred embodiment, the first assignment sub-rule is a first linear function with a negative gradient and the second assignment sub-rule is a second linear function with a positive gradient. Through the use of two linear functions with opposite gradient, the first assignment rule can replicate both the filling and the emptying of the bladder on the basis of simple equations. In this way, the processing time of the model can be shortened, and the processing power can be reduced.

In a further embodiment of the method, the second assignment rule is a second-degree polynomial function. In this way, the equation system can be solved easily using a quadratic equation, which in turn has a positive influence on the processing time and the processing power.

In a particularly preferred embodiment, the second assignment rule furthermore takes into consideration at least one form factor of the bladder, wherein both a geometrical shape of the bladder and a filling and/or emptying characteristic of the bladder may be taken into consideration. The method can thus easily replicate a wide variety of different bladder types, such that, in particular in the event of a change of the bladder type, of the bladder shape or of the bladder geometry, only the second assignment rule has to be adapted to the respective conditions.

In a further embodiment, a material behavior of the bladder effected as a result of the filling or emptying of the bladder is taken into consideration in the determination of the fluid pressure. The material behavior of the seat lining or of the seat foam of the vehicle seat may additionally be taken into consideration. By virtue of the material behavior of the bladder, of the seat lining and/or of the seat foam being taken into consideration, a settling behavior of the bladder during the filling and emptying of the bladder can be taken into consideration. The settling behavior describes a yielding of the bladder, seat lining and/or seat foam material during or after the filling and emptying, and is relevant in particular in the case of steady-state functions such as the restoration of a fluid pressure set for a long-term period in the bladder.

In a further embodiment, temporary fluid warming caused as a result of the filling of the bladder and/or temporary fluid cooling caused as a result of the emptying of the bladder is taken into consideration in the determination of the fluid pressure. In this way, temperature equalization phenomena after the filling or emptying of the bladder can be taken into consideration, whereby the determination of the fluid pressure in the bladder is made more accurate.

According to a second aspect of the present disclosure, a computer program product having a computer-readable memory medium with program code instructions which are stored thereon and which are executable by a computer is created, wherein the program code instructions which are executable by a computer are configured to carry out a method according to the first aspect or embodiments thereof.

The computer program product may for example be a processing device of a control unit of a pneumatic adjusting device.

According to a third aspect of the present disclosure, a pneumatic adjusting device for a vehicle seat is created. The pneumatic adjusting device comprises a pneumatic bladder, through the filling or emptying of which a contour of a seat bearing surface of the vehicle seat can be adjusted, a valve device which is connected to the bladder and which is designed for the filling or emptying of the bladder, and a control unit which is connected to the valve device and which is configured to carry out a method according to the first aspect or embodiments thereof.

Advantageous embodiments of the method can, where applicable to the pneumatic adjusting device, also be regarded as advantageous embodiments of the pneumatic adjusting device, and vice versa.

Figure 1:
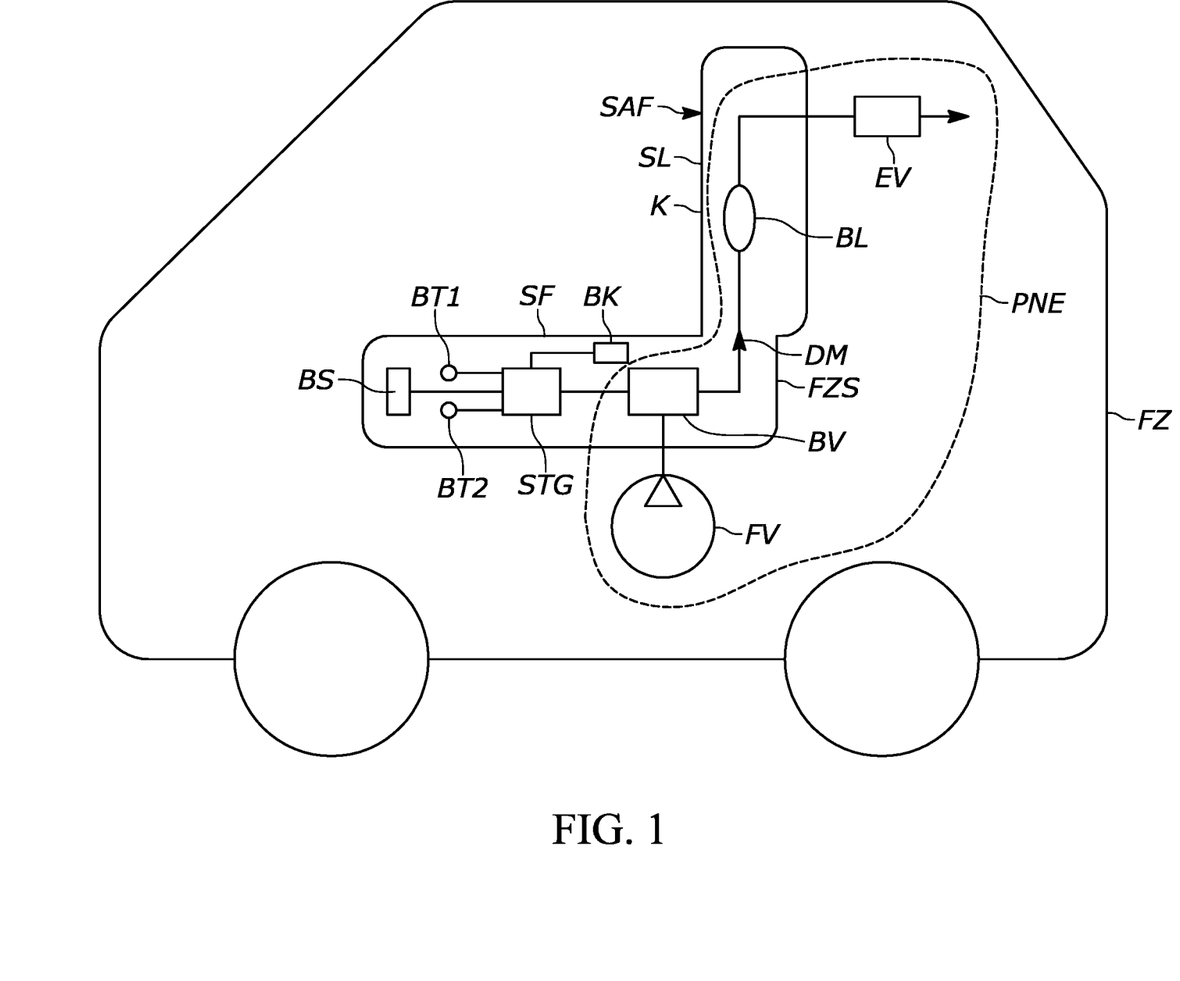
FIG. 1 is a schematic illustration of a vehicle having a vehicle seat, the seat bearing surface of which is variable in terms of contour.

Reference is firstly made to FIG. 1, which shows a vehicle FZ with a vehicle seat FZS. The vehicle seat FZS has a seat bearing surface SAF, which is formed by a seat surface SF and a backrest SL. The vehicle seat FZS has a pneumatic adjusting device PNE for the adjustment of a contour K of the seat bearing surface SAF. For this purpose, the pneumatic adjusting device PNE has, in the region of the backrest SL, a pneumatic bladder BL which is fillable with a fluid or pressure medium DM, in particular air. As a result of the filling of the bladder BL with pressure medium DM or the emptying or ventilation of the bladder BL, the volume of the bladder BL is changed, whereby a pressure on the backrest SL or the back-side seat bearing surface SAF of the vehicle seat FZS can be changed and the contour K of the seat bearing surface SAF can be adjusted.

For the filling and/or emptying of the bladder BL, the pneumatic adjusting device PNE has a valve device VE. The valve device VE firstly comprises a fluid compressor FV, which is connected to a filling valve BV and to the bladder BL for the filling of the bladder BL with fluid. The valve device VE secondly also comprises a ventilation valve EV which is connected to the bladder BL and which is designed for releasing the pressure medium DM into the surroundings. The valve device VE may be suitably activated using a control unit STG, as will furthermore also be discussed in more detail in FIG. 2, such that the bladder BL can be filled, the pressure in the bladder BL can be maintained or the bladder BL can be emptied.

Furthermore, the vehicle seat FZS has, in the present example, two switches or buttons BT1 and BT2, which are connected to the control unit STG. Here, said buttons BT1 and BT2 can be used by the vehicle occupants or users such that, for example when the button BT1 is actuated, the valve device VE is activated using the control unit STG so as to allow pressure medium DM to flow into the bladder BL, whereas, as a result of the button BT2 being pressed, the control unit STG triggers the valve device VE to release pressure medium DM from the bladder BL. The two buttons BT1 and BT2 thus serve for the manual setting of a desired pressure or of a desired fluid target pressure or fluid target pressure value in the bladder BL, and thus of the force with which the bladder BL adjusts the seat bearing surface SAF. Furthermore, a third button BS is provided, which serves for storing a pressure set in the bladder BL using the buttons BT1 and BT2 as desired fluid target pressure. It is conceivable here for a single actuation of the button BS to have the effect that a presently set pressure in the bladder BL is stored in a memory space in the control unit STG. Finally, a fourth button BK is also provided for the (re)setting or (re)establishment of a stored desired fluid target pressure.

It is pointed out that, to simplify the illustration in FIG. 1, only a single bladder BL is illustrated in the backrest SL. It is however also conceivable for two or more bladders to be provided in the backrest SL. It is also possible for one or more bladders to be provided in the seat surface SF of the vehicle seat FZS. Here, the pressure can, through the control unit STG, be set and also stored in either uniform or separate fashion.

Figure 2:
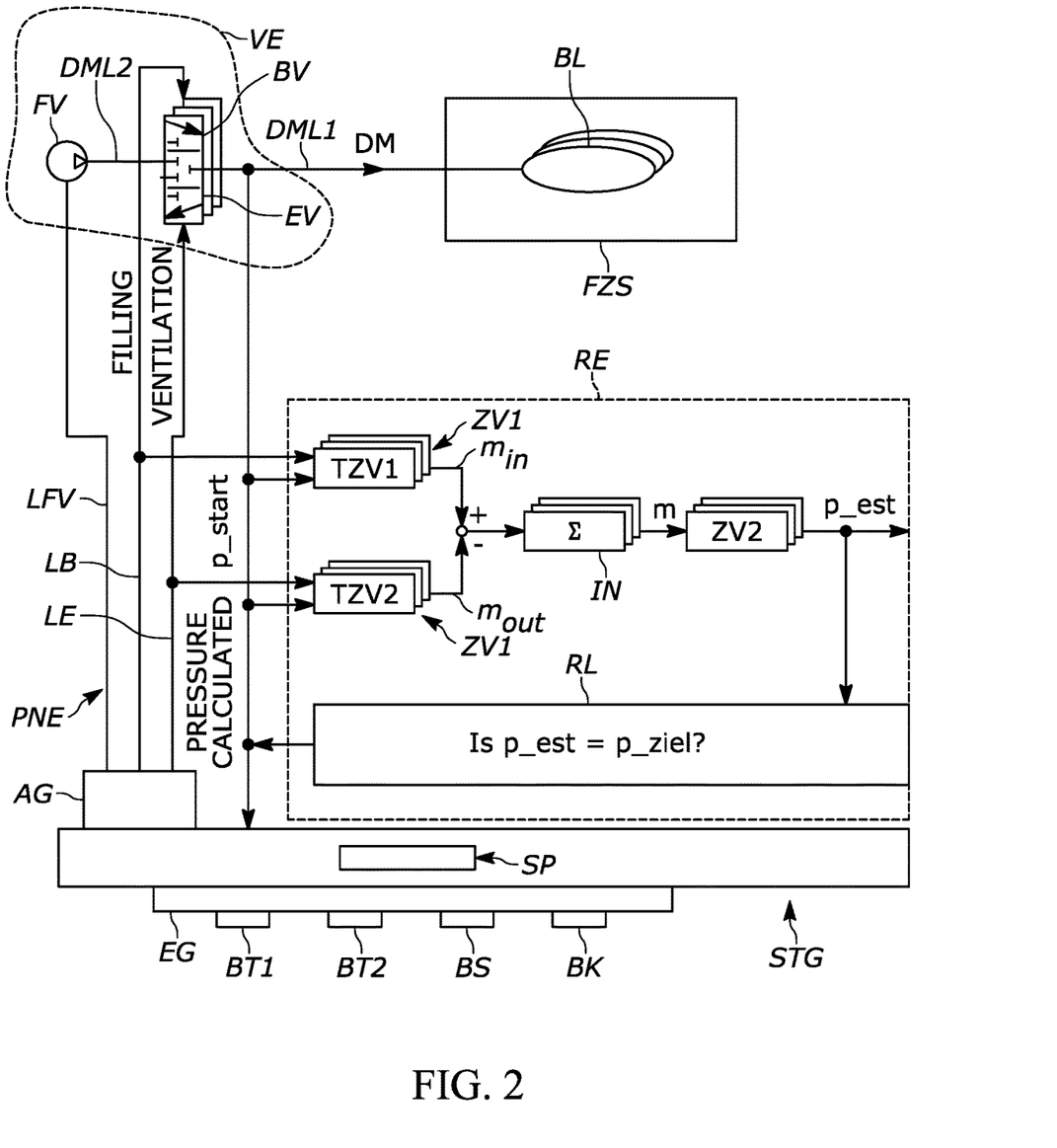
FIG. 2 is a schematic illustration of a pneumatic adjusting device for the vehicle seat of FIG. 1 as per a first embodiment.

Reference is now made to FIG. 2, which illustrates in more detail the components of the pneumatic adjusting device PNE that are illustrated in FIG. 1.

As has already been mentioned, the pneumatic adjusting device PNE comprises at least one bladder BL which is fillable with a fluid or pressure medium DM (such as air) and which, through a change in volume, is capable of adjusting the seat bearing surface SAF of the vehicle seat FZS. In the specific example of FIG. 2, the filling valve BV and the ventilation valve EV are combined in a valve assembly which, in the specific example of FIG. 2, is connected via a first pressure medium line DML1 to the bladder BL and via a second pressure medium line DML2 to the fluid compressor FV. In the specific example of FIG. 2, the valve assembly can assume three positions. In a first position, said valve assembly is configured to connect the fluid compressor FV to the bladder BL in order to perform filling of the bladder BL with pressure medium DM. In a second position, said valve assembly is configured to hold the pressure medium DM situated in the bladder BL. In a third position, said valve assembly is configured to release the pressure medium DM situated in the bladder BL from the bladder BL, and thus empty or ventilate the bladder.

The pneumatic adjusting device PNE furthermore comprises the abovementioned control unit STG for the control of the valve device VE, that is to say of the filling valve BV and of the ventilation valve EV, and of the fluid compressor FV. For this purpose, the control unit STG has an output AG which has control lines LB, LE and LFV for the activation of the filling valve BV, of the ventilation valve EV and of the fluid compressor FV. As will also be presented below, the control unit STG comprises a processing device RE, with which it is possible to determine a fluid pressure in the bladder BL or to restore a once-determined pressure. The processing device RE is an example of a computer program product which has a computer-readable memory medium, such as for example a hard drive, with program code instructions which are stored thereon and which are executable by a computer and which are configured for the determination of the fluid pressure in the bladder BL.

The control unit STG furthermore comprises an input portion EG, which in this case, in the specific example of FIG. 2, is connected to multiple switches or buttons BT1, BT2, BS and BK. As already discussed above, the two buttons BT1 and BT2 serve for manual setting of the fluid pressure in the bladder BL by a vehicle occupant or user, who is in particular seated on the vehicle seat FZS. The button BS serves for the storing of a manually set pressure in a memory SP of the control unit STG. Finally, a fourth button BK is also connected to the input EG, which fourth button serves for restoring a fluid pressure or fluid pressure value stored in the memory SP, as fluid target pressure or fluid target pressure value p_ziel, for pressure setting in the bladder BL.

Figure 3:
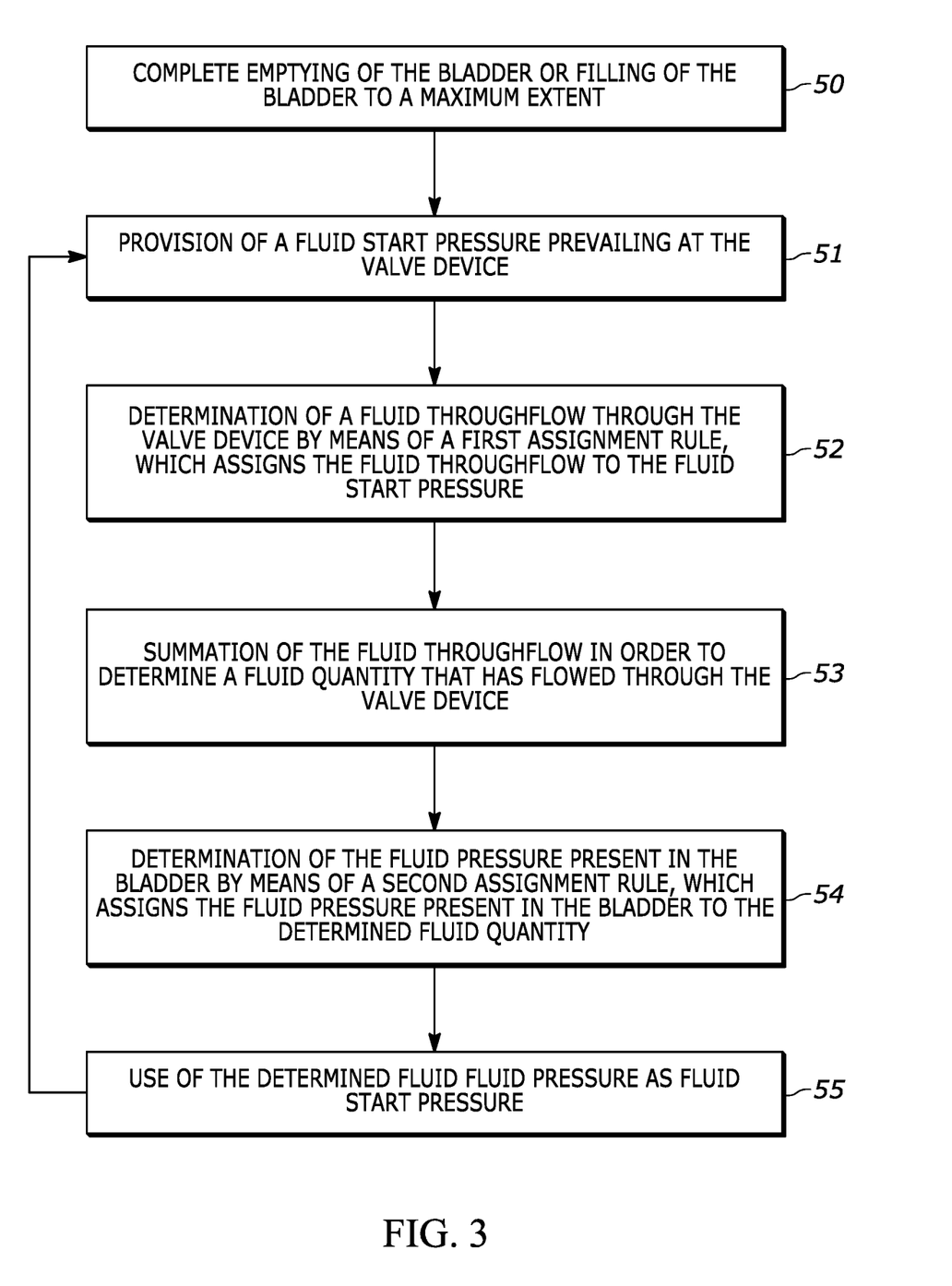
FIG. 3 shows a flow diagram for the determination of a fluid pressure in a pneumatic bladder of the pneumatic adjusting device of FIG. 2.

Reference is now made to FIG. 3, in which a flow diagram for the determination of a fluid pressure in the bladder BL will be discussed. With the flow diagrams described in FIG. 3, the fluid pressure present in the bladder BL can be determined without the use of a pressure sensor. In this way, it is for example possible for the fluid pressure set in the bladder BL by a user when pressing the buttons BT1, BT2 to be determined in sensorless fashion.

As will also be discussed further below in conjunction with FIG. 6, it is also possible for a once-determined pressure—for example a desired fluid target pressure—to be restored in the bladder BL. This may for example be performed by virtue of the user pushing the button BK, whereby the control unit STG activates the valve device VE such that the determined fluid pressure reaches or corresponds to the desired fluid target pressure.

Reference will firstly be made to the flow diagram of FIG. 3, in which the steps for the determination of the fluid pressure in the bladder BL will be discussed. For improved understanding, the steps discussed in FIG. 3 are explained together with the schematic illustration of FIG. 2.

To be able to determine the fluid pressure in the bladder BL, a fluid start pressure p_start prevailing at the valve device VE is firstly provided. As can be clearly seen in FIG. 2, the fluid start pressure p_start is, in the case of the ventilation of the bladder BL, the fluid pressure prevailing upstream of the ventilation valve EV. By contrast, in the case of the filling of the bladder BL, the fluid start pressure p_start is the fluid pressure prevailing downstream of the filling valve BV.

To be able to provide the fluid start pressure p_start for the first time, the pressure in the bladder must have a predetermined defined fluid pressure, or the bladder BL must have defined boundary conditions. For this purpose, the bladder BL is either emptied (step S0) until a pressure difference in relation to the ambient pressure no longer prevails in the bladder BL, and the bladder BL thus has a defined minimum fluid pressure of for example 1013 hPa (in this case as an example of the ambient pressure). Alternatively, the bladder BL is filled (step S0) until the bladder has a defined maximum fluid pressure. This may for example be the maximum delivery pressure of the fluid compressor FV, that is to say the pressure at which the fluid compressor FV can no longer deliver fluid into the bladder BL because the pressure in the bladder BL has the maximum counterpressure for the fluid compressor FV. The complete emptying of the bladder BL or the maximum filling of the bladder BL (step S0) may for example be carried out at the start of the flow diagram by the control unit STG through corresponding activation of the valve device VE. For this purpose, the control unit STG will for example completely empty the bladder BL, or fill the bladder BL to the maximum extent, regularly at predetermined time intervals in order to provide the fluid start pressure p_start. This is preferably performed when the vehicle FZ is being shut down, when the vehicle FZ is being boarded, when the vehicle FZ is being parked or prior to the commencement of travel.

After the fluid start pressure p_start has been provided for the first time (step S1) by complete emptying of the bladder BL or filling of the bladder BL to a maximum extent, a fluid throughflow through the valve device VE is, in the subsequent step (step S2), determined using a first assignment rule, which assigns the fluid throughflow to the fluid start pressure p_start prevailing at the valve device VE. The fluid throughflow may for example be a mass flow $\dot{m}=dm/dt$ or a (normalized) volume flow $\dot{V}_N=dV_N/dt$ through the valve device VE, which is determined using the first assignment rule on the basis of p_start. Here, a distinction must be made between the filling and the emptying of the bladder BL. For example, if the bladder BL was completely emptied and is now to be filled, the fluid compressor FV will deliver fluid through the filling valve BV into the bladder BL. For example, if the bladder BL was originally completely emptied and thus the fluid start pressure p_start corresponded to the ambient pressure of approximately 1013 hPa, then the first assignment rule ZV1 assigns for example a mass flow $\dot{m}_{in}$ of 0.2 g/s or a volume flow of 10 l/min through the filling valve BV, which is delivered by the fluid compressor FV through the filling valve BV into the bladder BL, to the fluid start pressure of 1013 hPa. By contrast, if the bladder BL was filled to a maximum extent and is now to be emptied, fluid is supplied through the ventilation valve EV to the environment. The first assignment rule ZV1 then assigns for example a mass flow $\overline{\dot{m}}_{out}$ of 0.3 g/s or a volume flow of 15 l/min to a maximum fluid start pressure p_start of 1500 hPa in the bladder BL. For this purpose, the first assignment rule ZV1 comprises a first assignment sub-rule TZV1, which replicates the filling of the bladder BL, and a second assignment sub-rule TZV2, which replicates the emptying or ventilation of the bladder BL. Here, the first assignment rule ZV1 or the first and second assignment sub-rules TZV1, TZV2 may be a look-up table, a characteristic map, a mathematical model or the like, which are for example stored in the control unit STG and accessible by the processing device RE, such that a corresponding fluid throughflow can be assigned to the p_start value.

If the fluid throughflow through the valve device VE or through the ventilation or filling valve EV, BV has been determined, the determined fluid throughflow is subsequently (step S3) summated or integrated over a predetermined period of time or a predetermined time step. For this purpose, the processing device RE will determine the integral IN of the fluid throughflow flowing into the bladder BL and flowing out of the bladder BL in order to thereby determine the fluid quantity that has flowed through the filling valve BV and the ventilation valve EV:

$$m=\int_0^t \dot{m}_{in}-\dot{m}_{out}dt+m_0 \qquad (1)$$

The fluid quantity may be a fluid mass m, as shown by way of example in equation (1). The fluid quantity may however also be a (normalized) fluid volume $V_N$, for example if the first assignment rule ZV1 assigns a (normalized) volume flow $\dot{V}_N$ to the fluid start pressure p_start. A typical time step t or a typical period of time t for the calculation of the integral IN is for example 0.2 s. The time step t may however also be longer or shorter and adapted to the respective usage situation and/or automatically determined by the processing device RE.

Figure 4:
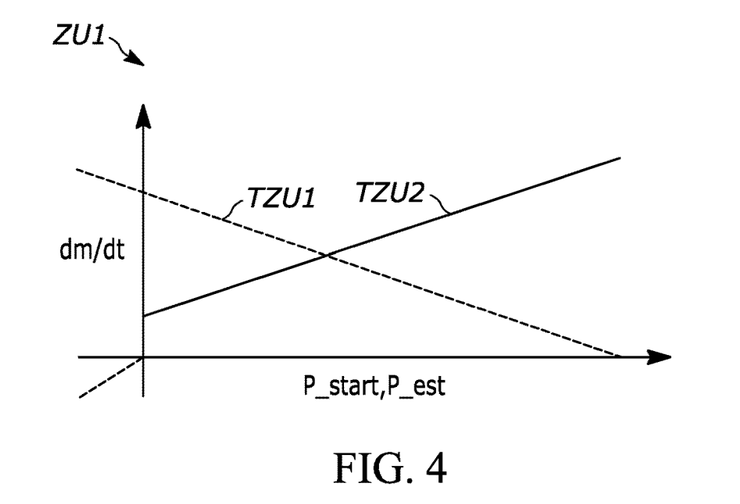
FIG. 4 shows an example for a first assignment rule for the determination of the fluid pressure in the pneumatic bladder.

Reference is now made to FIG. 4, which shows an example of a first assignment rule ZV1 as used in step S2.

In the specific example of FIG. 4, the first assignment rule ZV1 is a mathematical model which assigns a mass flow $\dot{m}=dm/dt$ to the fluid start pressure value p_start. Here, the first assignment rule ZV1 comprises a first assignment sub-rule TZV1 for the filling of the bladder BL and a second assignment sub-rule TZV2 for the emptying or ventilation of the bladder BL. In the specific example of FIG. 4, the first and second assignment sub-rules TZV1, TZV2 are each polynomial functions, in particular first-degree polynomial functions or linear functions. Here, the first assignment sub-rule TZV1 may for example be a first linear function, which approximates a characteristic map of the fluid compressor FV and/or a nozzle equation of the filling valve BV. It is particularly preferably possible for the first assignment sub-rule TZV1 to approximate a characteristic curve of the fluid compressor FV which specifies the fluid throughflow of the fluid compressor FV as a function of a counterpressure prevailing at the fluid compressor FV, wherein the counterpressure is for example the fluid pressure prevailing downstream of the filling valve BV. Here, the first linear function has a negative gradient, such that a relatively low fluid throughflow or mass flow through the filling valve BV is assigned to an increasing fluid pressure downstream of the filling valve BV.

Similarly to the first assignment sub-rule TZV1, the second assignment sub-rule TZV2 may also be a second linear function, which approximates a nozzle equation of the ventilation valve EV. Here, the second linear function has a positive gradient, such that a relatively high fluid throughflow or mass flow through the ventilation valve EV is assigned to an increasing fluid pressure upstream of the ventilation valve EV.

The first and second assignment sub-rules TZV1, TZV2 are specific to the components used in the pneumatic adjusting device PNE. The first and second assignment sub-rules TZV1, TZV2 may for example approximate the combination of fluid compressor FV, filling valve BV and/or ventilation valve EV used in the pneumatic adjusting device PNE. It is thus possible for different, specific first and second assignment sub-rules TZV1, TZV2 to be stored in the control unit STG, and accessible by the processing device RE, for different combinations of fluid compressor, filling valve and/or ventilation valve. The first and second assignment sub-rules TZV1, TZV2 may have been determined experimentally in advance or established on the basis of a fluid mechanics model and/or thermodynamic model.

It is self-evidently also possible for the first assignment rule ZV1 to approximate only the filling or only the emptying of the bladder BL, for example if the pneumatic adjusting device PNE has only a ventilation valve EV or only a fluid compressor FV with filling valve BV. It is also possible that, in the case of multiple bladders BL, the first assignment rule ZV1 assigns a respective fluid throughflow through the respective filling or ventilation valve to a fluid start pressure prevailing at the respective filling or ventilation valve.

Moreover, it is possible for the first assignment rule ZV1 to also take into consideration a flow resistance of the valve device VE, such as for example flow resistances in the pressure medium lines DML1, DML2, or further pressure medium lines which are not shown here.

Reference is now made again to FIG. 3, in which the further steps of the flow diagram are illustrated.

As soon as the processing device, in step S3, has determined the fluid quantity that has flowed through the filling valve BV or the ventilation valve EV, the fluid pressure pest present in the bladder BL is determined in step S4 using a second assignment rule ZV2, wherein the second assignment rule assigns the fluid pressure present in the bladder BL to the fluid quantity determined in step S3. An example for a second assignment rule ZV2 is shown in FIG. 5.

Figure 5:
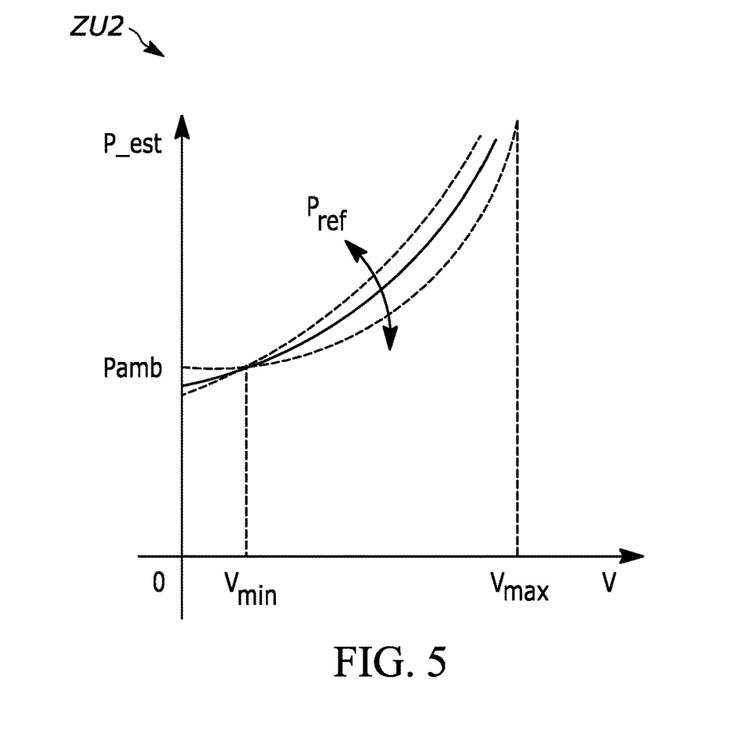
FIG. 5 shows an example for a second assignment rule for the determination of the fluid pressure in the pneumatic bladder.

In the specific example in FIG. 5, the second assignment rule ZV2 is a mathematical function of the form $$p\_est = p_{ref} \cdot \left( \frac{V_{max} - V_{min}}{V_{max} - V} - 1 \right) + p_{amb} \quad (2)$$

where $p_{amb}$ is the ambient pressure and V is the geometrical volume of the bladder BL or the bladder volume. Here, the variable $V_{max}$ describes the maximum bladder volume, that is to say the volume of the bladder BL in the presence of an infinitely high fluid pressure in the bladder BL. The variable $V_{min}$ describes the minimum bladder volume, that is to say the residual volume of the bladder BL that has been completely emptied to ambient pressure $p_{amb}$. The variable $p_{ref}$ describes a shape behavior of the bladder BL during the filling and emptying of the bladder BL.

Both the ratio $V_{max}/V_{min}$ and $p_{ref}$ are form factors which replicate geometrical characteristics of the bladder BL and a filling and/or emptying characteristic of the bladder BL. The second assignment rule ZV2 can thus be specifically adapted to the bladder BL respectively present in the pneumatic adjusting device PNE. The second assignment rule ZV2 may have been determined experimentally in advance for a respective bladder BL. The second assignment rule ZV2 may however also have been established on the basis of a fluid mechanics model and/or thermodynamic model.

If, in step S3, as mentioned above, a fluid mass m (see equation (1)) is determined, the volume V present in the second assignment rule ZV2 can be set in relation through the ideal gas equation $$p\_est = \frac{mRT}{V}, \quad (3)$$

where R is the specific gas constant and T is the temperature of the fluid. Here, the temperature T is approximately equated to the ambient temperature, though may also be adapted.

If one then enters the equations (2) and (3) into one another and solves for p_est, one obtains a second-degree polynomial function, which specifies the fluid pressure p_est to be determined in the bladder BL as a function of the fluid mass m in the bladder BL $$p\_est^2 + a(m)p\_est + b(m) = 0 \quad (4)$$

The variables a and b are obtained as a result of entering the equations (2) and (3) into one another. On the basis of the equation (4), the pressure p_est prevailing in the bladder can then be determined by solving the equation (4) for p_est. It is thus possible for the pressure present in the bladder BL to be determined without the need to perform a pressure measurement in the bladder BL.

As soon as the fluid pressure p_est determined in step S4 has been determined, the fluid pressure (p_est) determined from step S4 can, in step S5, be used as fluid start pressure p_start, and the steps S1 to S4 are run through once again. Here, in particular in step S3, the total fluid quantity that has flowed into the bladder BL and out of the bladder since the start of the flow diagram (step S0) is taken into consideration for determining the fluid pressure p_est present in the bladder BL.

As an example: If the original fluid start pressure p_start was set to 1013 hPa (completely emptied bladder BL), then this would correspond, according to the first assignment rule ZV1 or first assignment sub-rule TZV1, to a fluid throughflow of 0.2 g/s or 10 l/min through the filling valve BV. In step 3, it would then be determined that, in a time step of for example 0.2 s, a fluid quantity of 0.04 g or 0.033 l has flowed into the bladder BL. According to the second assignment rule ZV2 (step 4), this would correspond to a fluid pressure p_est of 1013 hPa+50 hPa, wherein the 50 hPa has arisen as a result of the inflow of the fluid quantity of 0.04 g or 0.033 l into the bladder BL. Subsequently, the determined fluid pressure, that is to say 1063 hPa, is used as a new fluid start pressure p_start for the second run-through of the steps S1 to S4. The first assignment rule ZV1 or first assignment sub-rule TZV1 would assign for example 0.19 g/s or 9.5 l/min to the new fluid start pressure p_start of 1063 hPa. Then, in step S3, the total fluid quantity that has flowed into the bladder BL will be determined for example as 0.078 g or 0.065 l. According to the second assignment rule ZV2 (step 4), this would correspond for example to a fluid pressure p_est of 1013 hPa+100 hPa. In step 5, the new fluid start pressure p_start for the renewed run-through of steps S1 to S4 would then be set to 1113 hPa.

The above sequence may be run through for as long as a vehicle occupant or user pushes for example the buttons BT1 (for filling the bladder BL) and BT2 (for emptying the bladder BL). It is thus possible for the fluid pressure in the bladder BL, once it has been set by the user, to be determined without the need for a pressure sensor.

Figure 6:
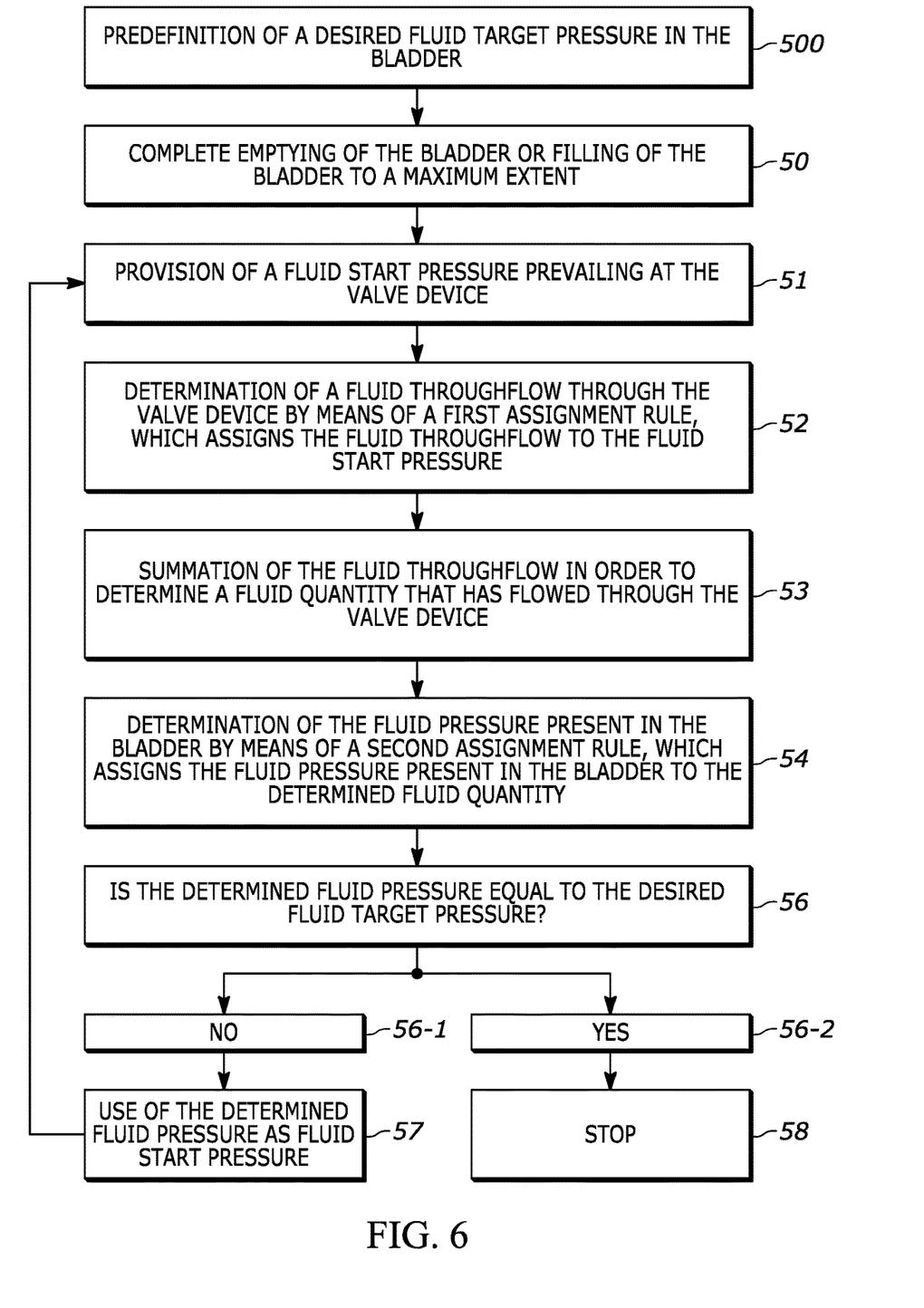
FIG. 6 shows a flow diagram for the restoration of a desired fluid target pressure in the pneumatic bladder.

Reference is now made to FIG. 6 as already mentioned above, which shows a flow diagram with which a once-determined pressure—determined for example using the flow diagram of FIG. 3—can be restored in the bladder BL.

The flow diagram of FIG. 6 differs from the flow diagram of FIG. 3 in that, in step S00, a desired fluid target pressure p_ziel is firstly predefined. This may for example be a fluid pressure set by the user by the pushing of the buttons BT1 and BT2. The fluid target pressure p_ziel may however also be predefined in some other way, for example using a user profile or the like. As soon as the fluid target pressure p_ziel has been predefined, the steps S0 to S4 that have already been described in conjunction with FIG. 3 are run through. That is to say, in step S0, the bladder BL is firstly fully emptied or filled to a maximum extent in order to provide the fluid start pressure p_start for the first time. The emptying of the bladder BL, or filling of the bladder BL to a maximum extent, is again preferably performed when the vehicle FZ is being shut down, when the vehicle FZ is being boarded, when the vehicle FZ is being parked or prior to the commencement of travel. In particular, the sequence of the steps S00 and S0 may also be interchanged. Subsequently, the steps S1 to S4 discussed in conjunction with FIG. 3 are run through.

However, by contrast to FIG. 3, not step S5 but rather instead step S6 is run through, in which the fluid pressure p_est in the bladder BL determined during the run-through of the steps S1 to S4 is compared with the desired fluid target pressure p_ziel. If the determined fluid pressure p_est does not correspond to the desired fluid pressure p_ziel (step S61), the determined fluid pressure p_est is used in step S7 as a new fluid start pressure p_start, and the steps S1 to S4 are run through again. This is performed until, in step S62, it is determined that the desired fluid target pressure p_ziel has been reached, and the sequence can be stopped (step S8).

The sequence of FIG. 6 may for example be started by virtue of the vehicle occupant or user pushing the button BK, whereby a once-set fluid pressure, or fluid pressure stored using the button BS, is restored in the bladder BL by virtue of the control unit STG activating the valve device VE until the determined fluid pressure p_est corresponds to the desired fluid target pressure p_ziel.

Even though, in conjunction with FIGS. 1 to 6, the fluid throughflow has been described as a mass flow or volume flow, it is also possible in other embodiments for other relationships, such as for example the internal energy (that is to say the variable temperature of the fluid), the heat of compression or the thermal transport to additionally also be able to be taken into consideration.

It is optionally also possible for additional influences (of the ambient pressure and the ambient temperature, the compressor rotational speed, the seat occupancy, etc.) to be used as further parameters for the first and/or second assignment rule ZV1, ZV2 or used as a scaling (offset, factor etc.) before or after the summation of the fluid throughflow obtained using the first assignment rule ZV1. The relationship between a further parameter and the scaling may in turn be stored as a separate characteristic map or as a separate assignment rule in order to further increase the pressure determination accuracy.

Furthermore, it is possible for a material behavior of the bladder BL effected as a result of the filling or emptying of the bladder BL to be taken into consideration in the determination of the fluid pressure. A material behavior of the seat lining or of the seat foam of the vehicle seat FZS may also be taken into consideration. This so-called setting behavior arises for example because, during the filling of the bladder BL, the materials of bladder BL, seat foam and/or seat lining initially oppose the volume increase of the bladder BL with an increased resistance, which gradually lessens again toward the end of the filling process. As a result, the pressure increase initially attained in the bladder BL during the filling subsequently decreases again slightly. The reverse effect arises during the emptying of the bladder BL: Here, the materials of bladder BL, seat foam and/or seat lining exert their force on the decreasing volume of the bladder initially with a delay. As a result, the pressure in the not completely emptied bladder BL increases again slightly toward the end of the emptying process.

It is also possible that fluid warming caused as a result of the filling of the bladder BL or fluid cooling caused as a result of the emptying of the bladder BL is taken into consideration in the determination of the fluid pressure. In this way, temperature equalization phenomena that arise when the fluid compressed and thus warmed during the filling process cools again and thus contracts after the filling process, or when the fluid remaining in the bladder BL, expanded and thus cooled during the emptying process, warms up and thus expands again after the emptying process, can be taken into consideration.

It is particularly advantageous that, using the first and second assignment rules, different combinations of fluid compressor FV, ventilation valve EV, filling valve BV or bladder BL can be replicated. In this way, it is possible for different pneumatic configurations to be represented with the same structure. For example, if a different pneumatic adjusting device uses a different fluid compressor, it is sufficient for only the first assignment rule to be adapted to this different fluid compressor. It is self-evidently also possible for pneumatic adjusting devices with multiple bladders BL to be replicated. For this purpose, it is merely necessary for an associated first and/or second assignment rule ZV1, ZV2 to be provided for each bladder.

It is also possible for in each case separate first and/or second assignment rules ZV1, ZV2 to be provided for different bladder types, shapes or geometries or for fast filling/emptying or for slow filling/emptying of the bladders.

It is also particularly advantageous that, in particular in the case of massage functions, only a complete emptying of the bladder BL is provided in step S0, because the inactive (massage) bladder is normally in any case fluidically connected to the environment owing to the use of the massage function.

The invention claimed is:

1. A method for determining a fluid pressure in a pneumatic bladder of a pneumatic adjusting device of a vehicle seat, wherein the pneumatic bladder is connected to a valve device for the filling or emptying of the bladder with or of fluid, and the method comprising the steps of:
   a) providing a fluid start pressure, prevailing at the valve device, as initial pressure in the determining of the fluid pressure in the bladder;

b) determining a fluid throughflow through the valve device using a first assignment rule which assigns the fluid throughflow to the fluid start pressure prevailing at the valve device;
c) summing the fluid throughflow obtained using the first assignment rule over a predetermined period of time in order to determine a fluid quantity that has flowed through the valve device; and
d) determining the fluid pressure present in the bladder using a second assignment rule which assigns the fluid pressure present in the bladder to the determined fluid quantity, wherein the fluid temperature is taken into consideration in the determining of the fluid pressure.

2. The method as claimed in claim 1, wherein the fluid throughflow is a mass flow and the fluid quantity is a fluid mass, or the fluid throughflow is a volume flow and the fluid quantity is a fluid volume.

3. The method as claimed in claim 1, further comprising repeating the steps a) to d), wherein the fluid pressure determined during the previous executing of the steps a) to d) is used as fluid start pressure in the subsequent executing of the steps a) to d).

4. The method as claimed in claim 3, furthermore comprising:
predefining a desired fluid target pressure in the bladder; and
repeating the steps a) to d) until the determined fluid pressure reaches the desired fluid target pressure.

5. The method as claimed in claim 1, wherein fluid start pressure is initially provided by emptying the bladder until a defined minimum fluid pressure is present in the bladder, and the defined minimum fluid pressure is used as fluid start pressure.

6. The method as claimed in claim 1, wherein, the fluid start pressure is initially provided by filling the bladder until a defined maximum fluid pressure is present in the bladder, and the defined maximum fluid pressure is used as fluid start pressure.

7. The method as claimed in claim 1, wherein the valve device comprises a fluid compressor, and a filling valve connected to the fluid compressor, and for the filling of the bladder, and the first assignment rule approximates at least one of a characteristic curve of the fluid compressor and a nozzle equation of the filling valve.

8. The method as claimed in claim 7, wherein the first assignment rule is a first-degree polynomial function.

9. The method as claimed in claim 1, wherein the valve device comprises a ventilation valve for the emptying of the bladder, and the first assignment rule approximates a nozzle equation of the ventilation valve.

10. The method as claimed in claim 1, wherein the valve device comprises a fluid compressor, a filling valve connected to the fluid compressor configured to fill the bladder and a ventilation valve configured to empty the bladder, and the first assignment rule comprises a first assignment sub-rule for the filling of the bladder and a second assignment sub-rule for the emptying of the bladder.

11. The method as claimed in claim 10, wherein the first assignment sub-rule takes into consideration at least one of a characteristic curve of the fluid compressor and a nozzle equation of the filling valve, and the second assignment sub-rule takes into consideration a nozzle equation of the ventilation valve.

12. The method as claimed in claim 11, wherein the first assignment sub-rule is a first linear function with a negative gradient and the second assignment sub-rule is a second linear function with a positive gradient.

13. The method as claimed in claim 1, wherein the second assignment rule is a second-degree polynomial function.

14. The method as claimed in claim 13, wherein the second assignment rule takes into consideration at least one form factor of the bladder.

15. The method as claimed in claim 1, wherein a material behavior of the bladder effected as a result of the filling or emptying of the bladder is taken into consideration in the determining of the fluid pressure.

16. The method as claimed in claim 1, wherein at least one of fluid warming caused as a result of the filling and fluid cooling caused as a result of the emptying of the bladder is taken into consideration in the determining of the fluid pressure.

17. A computer program product having a computer-readable memory medium with program code instructions which are stored thereon and which are executable by a computer, wherein the program code instructions which are executable by a computer are configured to carry out a method as claimed in claim 1.

18. A pneumatic adjusting device for a vehicle seat, comprising:
a pneumatic bladder configured to adjust a contour of a seat bearing surface of the vehicle seat through at least one of being filled and emptied,
a valve device connected to the bladder, the valve device configured to at least one of fill and empty the bladder, and
a control unit which connected to the valve device and configured to carry out a method as claimed in claim 1.

* * * * *